(12) United States Patent
Kim et al.

(10) Patent No.: US 9,350,189 B2
(45) Date of Patent: May 24, 2016

(54) BATTERY PACK AND METHOD OF CONTROLLING THE SAME

(71) Applicant: Samsung SDI Co., Ltd., Yongin-si, Gyeonggi-do (KR)

(72) Inventors: Hyun Kim, Yongin-si (KR); Ri-A Ju, Yongin-si (KR); Ji-Hong Lim, Yongin-si (KR); Suk-Kyum Kim, Yongin-si (KR); Seung-Joon Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 334 days.

(21) Appl. No.: 13/785,021

(22) Filed: Mar. 5, 2013

(65) Prior Publication Data

US 2013/0249492 A1    Sep. 26, 2013

Related U.S. Application Data

(60) Provisional application No. 61/613,163, filed on Mar. 20, 2012.

(51) Int. Cl.
*H02J 7/00* (2006.01)
*B60R 16/03* (2006.01)
(Continued)

(52) U.S. Cl.
CPC ............. *H02J 7/007* (2013.01); *B60L 11/1859* (2013.01); *B60R 16/03* (2013.01); *H01M 10/46* (2013.01); *H01M 10/48* (2013.01); *H02J 7/0063* (2013.01);
(Continued)

(58) Field of Classification Search
CPC ........... H02J 7/007; H02J 7/14; H02J 7/0063; H02J 2007/0067; H01M 10/46; H01M 10/48; H01M 220/20; H01M 2010/4271; B60L 11/1859; B60R 16/03

USPC ..................... 320/128, 134; 701/22; 180/65.2
See application file for complete search history.

(56) References Cited

U.S. PATENT DOCUMENTS

| 4,902,956 A | 2/1990 | Sloan |
| 5,293,076 A | 3/1994 | Fukui |

(Continued)

FOREIGN PATENT DOCUMENTS

| CN | 202006735 U | 10/2011 |
| DE | 4212819 A1 | 10/1992 |

(Continued)

OTHER PUBLICATIONS

The extended European Search Report issued on Apr. 17, 2014 by EPO in connection with European Patent Application No. 13155809.0 which also claims U.S. Appl. No. 61/613,163 as its priority document.

(Continued)

*Primary Examiner* — M'Baye Diao
(74) *Attorney, Agent, or Firm* — Robert E. Bushnell, Esq.

(57) ABSTRACT

A battery pack for starting an engine having an idle stop & go (ISG) system in which the engine is repeatedly stopped and restarted to conserve fuel. This battery pack includes: a rechargeable battery; a first ISG current control unit having a variable resistor electrically connected to the rechargeable battery; and a battery management system (BMS) electrically connected to the rechargeable battery and the first ISG current control unit, said BMS sets a resistance value of the variable resistor according to a current mode of the ISG system.

18 Claims, 9 Drawing Sheets

(51) Int. Cl.
*H01M 10/48* (2006.01)
*B60L 11/18* (2006.01)
*H01M 10/46* (2006.01)
*H01M 10/42* (2006.01)
*H02J 7/14* (2006.01)

(52) U.S. Cl.
CPC ... *H01M 2010/4271* (2013.01); *H01M 2220/20* (2013.01); *H02J 7/14* (2013.01); *H02J 2007/0067* (2013.01); *Y02T 10/705* (2013.01); *Y02T 10/7005* (2013.01); *Y02T 10/92* (2013.01)

(56) References Cited

U.S. PATENT DOCUMENTS

| | | | |
|---|---|---|---|
| 6,759,760 | B2 | 7/2004 | Gaynier et al. |
| 7,525,287 | B2 * | 4/2009 | Miyashita et al. ............ 320/134 |
| 8,028,778 | B2 * | 10/2011 | Luo et al. ................... 180/65.22 |
| 2005/0109550 | A1 * | 5/2005 | Buglione et al. ............. 180/65.2 |
| 2007/0163820 | A1 * | 7/2007 | Hoogenraad ................ 180/65.2 |
| 2009/0102425 | A1 | 4/2009 | Takahashi |
| 2010/0055543 | A1 | 3/2010 | Tae et al. |
| 2011/0140533 | A1 | 6/2011 | Zeng et al. |
| 2011/0246013 | A1 * | 10/2011 | Yee et al. ........................ 701/22 |
| 2011/0248678 | A1 | 10/2011 | Wade et al. |
| 2012/0143468 | A1 * | 6/2012 | Kim et al. ..................... 701/102 |

FOREIGN PATENT DOCUMENTS

| | | |
|---|---|---|
| DE | 19952112 A1 | 6/2001 |
| DE | 102007026164 A1 | 12/2008 |
| JP | 07-069142 | 3/1995 |
| JP | 2001-313199 | 11/2001 |
| KR | 10-2004-0037443 | 5/2004 |
| KR | 10-2010-0116447 | 11/2010 |
| WO | 2011119161 A1 | 9/2011 |

OTHER PUBLICATIONS

Chinese Office Action issued by Chinese Patent Office on Mar. 18, 2016 in connection with Chinese Patent Application No. 201310084340.2.

* cited by examiner

BATTERY PACK AND METHOD OF CONTROLLING THE SAME

CLAIM OF PRIORITY

This application claims priority to and the benefit of Provisional Application No. 61/613,163 filed on 20 Mar. 2012, in The United States Patent and Trademark Office, the entire content of which is incorporated herein by reference.

BACKGROUND OF THE INVENTION

1. Field of the Invention

The present invention generally relates to a battery pack and a method of controlling the same.

2. Description of Related Art

Unlike primary batteries, secondary batteries may be charged and discharged. Second batteries are used as energy sources of mobile devices, electric cars, hybrid cars, electric bicycles, uninterruptible power supply apparatuses, and the like, and are used in the form of single batteries or a single battery module by connecting a plurality of batteries in a single unit according to a type of an applied external device.

The above information disclosed in this Related Art section is only for enhancement of understanding of the background of the invention and therefore it may contain information that does not form the prior art that is already known to a person of ordinary skill in the art.

SUMMARY OF THE INVENTION

One or more embodiments of the present invention may include a battery pack for starting an engine having an idle stop & go (ISG) system in which the engine is repeatedly stopped and restarted to conserve fuel. The battery pack may include: a rechargeable battery; a first ISG current control unit having a variable resistor electrically connected to the rechargeable battery; and a battery management system (BMS) electrically connected to the rechargeable battery and the first ISG current control unit, said BMS sets a resistance value of the variable resistor according to a current mode of the ISG system.

The BMS may set the resistance value of the variable resistor as a first resistance value to form a charging and discharging path when the current mode is in a driving mode of the ISG system, and set a second resistance value to form a ISG current path when the current mode is in a sleep mode of the ISG system.

The driving mode of the ISG system of the engine is at an idling speed or greater of the engine and the sleep mode of the ISG system of the engine is when the engine is turned off.

Further, the first resistance value may be less than the second resistance value.

Still further, the BMS detects a voltage of the rechargeable battery when the ISG system is in a sleep mode and adjusts the resistance value of the variable resistor according to the voltage of the rechargeable battery, said sleep mode of said ISG system is when the engine is turned off.

The voltage of the rechargeable battery is detected by the BMS as lower than a predetermined value and the resistance value of the variable resistor is increased by the BMS.

The battery pack may also include: a charging and discharging unit electrically connected to the rechargeable battery and the first ISG current control unit; and a mode control unit selectively electrically connected to the charging and discharging unit and the first ISG current control unit.

The charging and discharging unit forms a charging and discharging path when the ISG system is in a driving mode and the first ISG current control unit forms a first ISG current path when the ISG system is in a sleep mode.

Further, the driving mode of the ISG system of the engine is at an idling speed or greater of the engine and the sleep mode of the ISG system of the engine is when the engine is turned off.

The charging and discharging unit may be a conductor, resistor or a switch.

When the ISG system is in the driving mode, the mode control unit is switched to connect to a first switching terminal (S1) so that a current output from the rechargeable battery is electrically connected to the first terminal through the charging and discharging unit and a charging current is supplied through the first terminal to the rechargeable battery through the charging and discharging unit from a power generation module.

When the ISG system is in the sleep mode, the mode control unit is switched to connect a second switching terminal (S2) so that a current output from the rechargeable battery is supplied to electrical loads through the first ISG current control unit and the first terminal.

The electrical loads may be a plurality of electrical loads with a portion of said plurality of electrical loads never allowed to be turned off in the sleep mode.

The battery pack may also include a second ISG current control unit electrically connected to the rechargeable battery, the charging and discharging unit and the mode control unit to supply electrical power from the rechargeable battery to an electrical load connected to a fourth terminal through a second ISG current path at all times in both the driving mode and the sleep mode.

The second ISG current control unit may be a switch that is turned on in both the driving mode and sleep mode, and turned off in either the driving or the sleep mode when a potentially dangerous condition is detected in the battery pack by a main control unit electrically connected to the battery pack through a third terminal.

The battery pack may also include a charging and discharging unit electrically connected to the rechargeable battery, the BMS and the first ISG current control unit, said first ISG current control unit forming a fourth ISG current path with a fourth terminal; and a third ISG current control unit having a variable resistor electrically connected between the rechargeable battery and a fifth terminal to form a fifth ISG current path, The BMS controls variable resistance values in the first and third ISG current control units may be greater in a sleep mode than in a driving mode.

The BMS separately controls the variable resistance values of the first ISG current control unit and the third ISG current control unit to vary the voltage supplied to the fourth and fifth terminals.

The battery pack may also include a first sensor electrically connected in series between the rechargeable battery and the first ISG current control unit to sense the current flow in the fourth ISG current path; and a second sensor electrically connected in series between the rechargeable battery and the third ISG current control unit to sense the current flow in the fifth ISG current path.

Sensing results of the current flows sensed by the first and second sensors may be transmitted to the BMS.

The BMS separately controls the variable resistance values of the first ISG current control unit and the third ISG current control unit based on the sensing results of the current flow received from the first sensor and the second sensor.

The battery pack may also include: a first switch electrically connected in series between first ISG current control unit and the fourth terminal to form the fourth ISG current path; and a second switch electrically connected in series between third ISG current control unit and the fifth terminal to form the fifth ISG current path.

The first and second switches may be connected to and under the control of the BMS and either or both the first and second switch are opened to block current leakage.

The engine is an internal combustion engine started by a starter motor connected to the engine and the battery pack and under the control of a main control unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The attached drawings for illustrating preferred embodiments of the present invention are referred to in order to gain a sufficient understanding of the present invention, the merits thereof, and the objectives accomplished by the implementation of the present invention. The invention may, however, be embodied in many different forms and should not be construed as being limited to the embodiments set forth herein; rather, these embodiments are provided so that this disclosure will be thorough and complete, and will fully convey the concept of the invention to those skilled in the art. Meanwhile, the terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. While such terms as "first," "second," etc., may be used to describe various components, such components must not be limited to the above terms. The above terms are used only to distinguish one component from another.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Typically, a lead storage battery is used as a power supply for starting up an engine. Recently, an idle stop & go (ISG) system for improving fuel efficiency has been increasingly used and has been. In spite of the output properties and frequent starting-up of a power supply for supporting an ISG system for restricting a no-load operation, the discharge properties of the power supply need to be maintained and a long lifetime of the power supply needs to be ensured. However, since an engine of a typical lead storage battery is repeatedly stopped and started up under an ISG system, the charge and discharge properties of the lead storage battery may deteriorate.

One or more embodiments of the present invention control a dark current generated in a sleep mode in which an engine of a car, an electric bicycle, etc. including a battery pack does not start inside the battery pack by using a simple structure. The battery pack provides a function of controlling the dark current to further inactivate a function of a main control unit of the car, the electric bicycle, etc. in the sleep mode and reduce power consumption.

Figure 1:
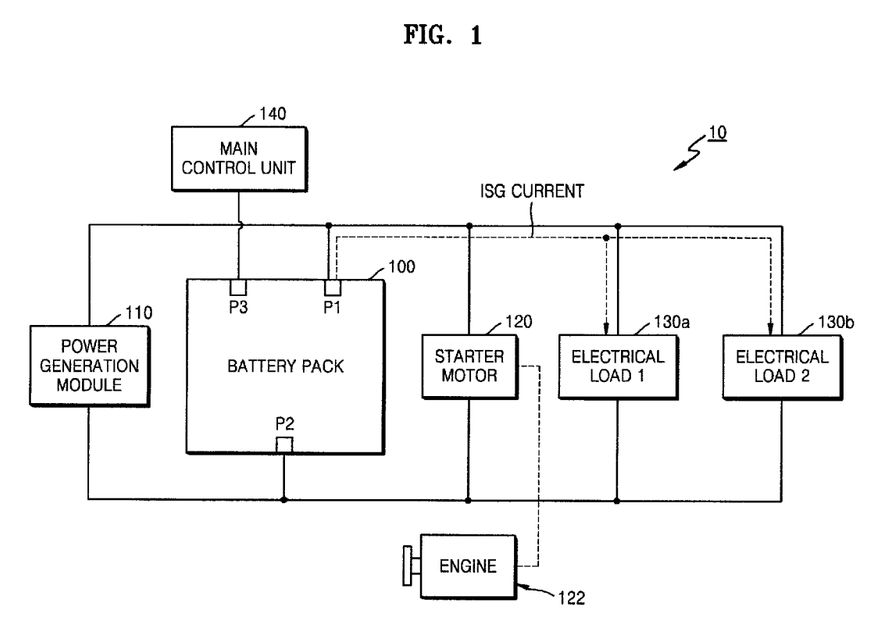
FIG. 1 is a diagram of a structure of a vehicle in which a battery pack is mounted according to an embodiment of the present invention.

FIG. 1 is a diagram of a structure of a vehicle 10 in which a battery pack 100 is mounted according to an embodiment of the present invention.

The battery pack 100 according to an embodiment of the present invention may be mounted in the vehicle 10 including an engine 122. The vehicle 10 may be, for example, a car, an electric bicycle, etc.

The battery pack 100 may store charging power generated by a power generation module 110 and supply discharged power to a starter motor 120. For example, the power generation module 110 may be connected to a driving axis of the engine 122 to convert rotational power into an electric output. In this regard, the charging power generated by the power generation module 110 may be supplied to the battery pack 100. For example, the power generation module 110 may include a DC generator (not shown) or an AC generator (not shown) and a rectifier (not shown), and may supply a DC voltage of about DC 15V, more particularly, a DC voltage of about 14.6V to about 14.8V.

For example, the starter motor 120 operates when the engine 122 starts, and may provide initial rotational power used to rotate the driving axis of the engine. For example, the starter motor 120 may receive stored power through first and second terminals P1 and P2 of the battery pack 100 and rotate the driving axis when the engine operates or when the engine 122 operates again after an idle stop to start the engine 122. The starter motor 120 operates when the engine 122 starts. The power generation module 110 may operate and generate the charging power when the engine 122 that starts by the starter motor 120 operates.

For example, the battery pack 100 may be applied as a power supply apparatus for starting an engine 122 of an idle stop & go (ISG) system that implements an ISG function so as to better fuel efficiency. The engine 122 of the ISG system frequently repeats stopping and restarting, and thus the battery pack 100 is repeatedly charged and discharged.

Since a lead storage battery applied to a typical ISG system is repeatedly charged and discharged, a service life of the lead storage battery may be reduced and the charging and discharging properties of the lead storage battery may deteriorate. For example, the lead storage battery is repeatedly charged and discharged, start capability of the engine 122 may deteriorate and the lead storage battery may be frequently exchanged.

For example, since the battery pack 100 according to an embodiment of the present invention may include a lithium ion battery that has charging and discharging properties that are maintained relatively constant and hardly deteriorates along with service time, compared to a lead storage battery, the battery unit 105 may be appropriately applied to the ISG system whose engine 122 is repeatedly stopped and started up. The battery pack 100 may have a low weight and may have improved fuel efficiency, compared to a lead storage battery having the same discharge capacity. In addition, the battery pack 100 may have a charging capacity by using a smaller volume than that of a lead storage battery, thereby reducing a loading space. However, the battery pack 100 is not limited to a lithium ion battery and may be, for example, a nickel metal hydride battery (NiMH) or other electrical energy storage device.

At least one electrical load may be connected to the battery pack 100, together with the power generation module 110 and the starter motor 120. The at least one electrical load is exemplified as an electrical load 1 130a and an electrical load 2 130b in the present specification. The number of and the types of the electrical loads may vary according to an example of the vehicle 10. The electrical load 1 130a and the electrical load 2 130b may consume power stored in the battery pack 100 and receive stored discharging power through the first and second terminals P1 and P2. The electrical load 1 130a and the electrical load 2 130b may be a variety of types of electric apparatuses such as a navigation apparatus, an audio, a lighting apparatus, a car black box, an anti-theft apparatus, and the like.

The main control unit 140 is a control unit for controlling an overall operation of the vehicle 10 in which the battery pack 100 is mounted. The main control unit 140 may be connected to the battery pack 100 through a third terminal P3, exchange a control signal with the battery pack 100, monitor a status of the battery pack 100, and control an operation of the battery pack 100.

The vehicle 10 according to an embodiment of the present invention may operate in a driving mode when the engine 122 of the vehicle 10 starts and in a sleep mode when the engine 122 of the vehicle 10 does not start. An operating mode of the vehicle 10 may be set and controlled by the main control unit 140. The main control unit 140 may control the battery pack 100, the electrical load 1 130a and the electrical load 2 130b, and elements of the vehicle 10 according to the operating mode of the vehicle 10.

The battery pack 100 performs a charging operation of charging power supplied by the power generation module 110 and a discharging operation of supplying electricity to the starter motor 120 and the electrical load 1 130a and the electrical load 2 130b in the driving mode. The battery pack 100 does not perform the charging operation and performs an operation of supplying a current to the electrical load 1 130a and the electrical load 2 130b in the sleep mode. The current supplied to the electrical load 1 130a and the electrical load 2 130b in the sleep mode, when the engine 122 is not operating, is referred to as a dark current. The battery pack 100 consumes power in the sleep mode by using the dark current.

The power stored in the battery pack 100 is supplied to the starter motor 120 in order to start the engine 122 again when the sleep mode is changed to the driving mode, i.e. when the engine 122 of the vehicle 10 starts. However, in a case where no driving power is supplied to the starter motor 120 since the battery pack 100 is discharged in the sleep mode due to the dark current, it is likely that the engine 122 of the vehicle 10 does not start again.

The embodiments of the present invention provide a function of controlling the dark current of the battery pack 100 in order to block the dark current. Also, a variable resistor is used to control the dark current, and thus the dark current is controlled by using a simple structure.

Figure 2:
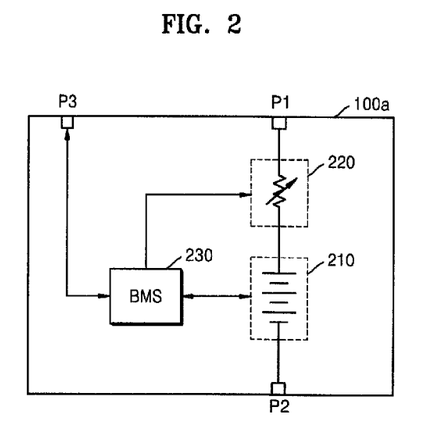
FIG. 2 is a diagram of a structure of a battery pack according to an embodiment of the present invention.

FIG. 2 is a diagram of a structure of a battery pack 100a according to an embodiment of the present invention.

The battery pack 100a according to an embodiment of the present invention may include a battery cell 210, a first ISG current control unit 220, and a battery management system (BMS) 230.

The battery cell 210 may be implemented as a lithium ion battery, an NiMH or the like. The battery cell 210 is charged with a charging current supplied from the power generation module 110. The battery cell 210 may supply the charged power to the starter motor 120 and the electrical load 1 130a and the electrical load 2 130b.

According to an embodiment of the present invention, a charging and discharging path of the battery cell 210 and a path through which a dark current flows in a sleep mode are commonly formed so that a charging and discharging current and the dark current flow by using the first ISG current control unit 220.

The first ISG current control unit 220 includes a variable resistor. A resistance value of the variable resistor varies with a control signal received from the BMS 230. The BMS 230 may control the resistance value of the variable resistor according to a current mode of the vehicle 10. For example, the BMS 230 sets the resistance value of the variable resistor as a first resistance value used to form the charging and discharging path if the current mode is a driving mode, and sets it as a second resistance value used to form the dark current path if the current mode is the sleep mode. In this regard, the first resistance value is smaller than the second resistance value.

According to another embodiment of the present invention, the BMS 230 may control the resistance value of the variable resistor in the sleep mode. For example, the BMS 230 may detect a voltage of the battery cell 210 in the sleep mode, control the resistance value of the variable resistor according to the voltage of the battery cell 210, and control the dark current. In this case, the lower the voltage of the battery cell 210, the greater the resistance value of the variable resistor, and thus the dark current may be reduced in a case where the charging power of the battery cell 210 becomes small.

Figure 3:
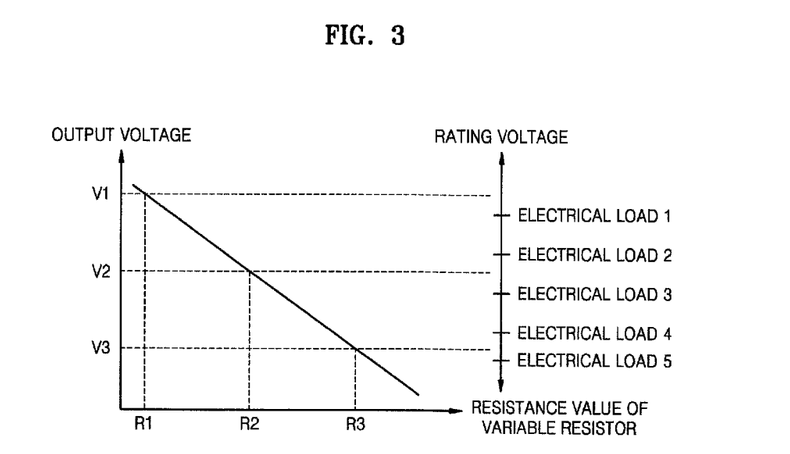
FIG. 3 is a graph of an output voltage of a first terminal with respect to a resistance value of a variable resistor according to an embodiment of the present invention.

FIG. 3 is a graph of an output voltage of the first terminal P1 with respect to a resistance value of a variable resistor according to an embodiment of the present invention.

Referring to FIG. 3, the greater the resistance value of the variable resistor, the smaller the output voltage of the first terminal P1. According to an embodiment of the present invention, a relationship between the resistance value of the variable resistor and the output voltage of the first terminal P1 is used to turn electrical loads off step by step. For example, the resistance value of the variable resistor is controlled to three steps of R1, R2, and R3 in a sleep mode. If the output voltage of the first terminal P1 is changed to V1, V2, and V3 according to the change of the resistance value of the variable resistor, electrical loads are automatically turned off according to rating voltage levels thereof. For example, in a case where the resistance value of the variable resistor is R1, and the output voltage of the first terminal P1 is V1, electrical loads 1 through 5 having rating voltage levels lower than V1 are all turned on. In a case where the resistance value of the variable resistor is R2, and the output voltage of the first terminal P1 is V2, the electrical loads 1 and 2 having rating voltage levels higher than V2 are all turned off, and the electrical loads 3 through 5 are turned on. In a case where the resistance value of the variable resistor is R3, and the output voltage of the first terminal P1 is V3, the electrical loads 1 through 4 having rating voltage levels higher than V3 are all turned off, and the electrical load 5 is turned on. Also, the resistance value of the variable resistor may be set as a maximum value or the variable resistor may be turned off in order to block the dark current.

According to an embodiment of the present invention, the variable resistor may have a predetermined discontinuous number of resistance values in order to turn the electrical loads 1 through 5 off step by step.

Figure 4:
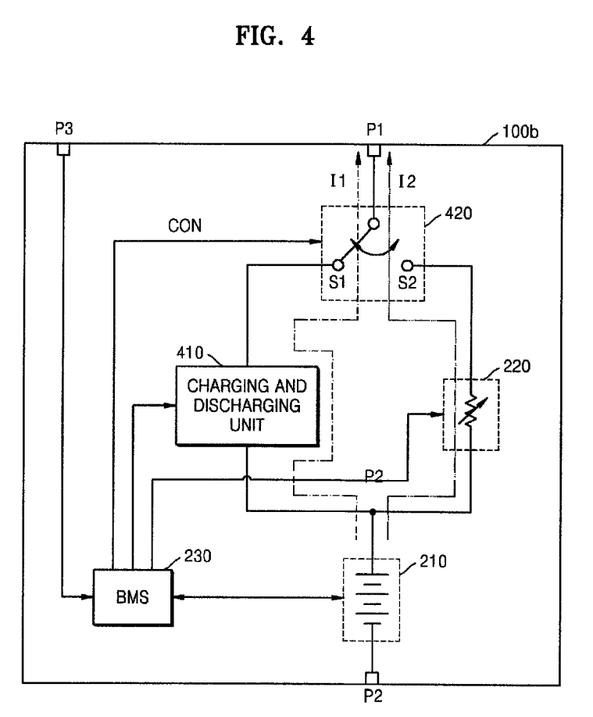
FIG. 4 is a diagram of a structure of a battery pack according to another embodiment of the present invention.

FIG. 4 is a diagram of a structure of a battery pack 100b according to another embodiment of the present invention.

The battery pack 100b according to another embodiment of the present invention may include the battery cell 210, the first ISG current control unit 220, the BMS 230, a charging and discharging unit 410, and a mode control unit 420.

According to the present embodiment, the battery pack 100b may separately include a charging and discharging path I1 and a first dark current path I2. The first terminal P1 may be connected to the battery cell 210 through the charging and discharging path I1 or through the first dark current path I2 according to an operating mode of the vehicle 10. The charging and discharging path I1 is a path connected to the charging and discharging unit 410. The first dark current path I2 is a path connected to the first ISG current control unit 220.

The charging and discharging unit 410 forms the charging and discharging path I1 when the vehicle 10 is in a driving mode. According to an embodiment, the charging and discharging unit 410 may be implemented to include a conductor. According to another embodiment, the charging and discharging unit 410 may be implemented to include a resistor. According to another embodiment, the charging and discharging unit 410 may be implemented to include a switch. According to another embodiment, the charging and discharging unit 410 may be implemented to include a charging path and a discharging path in parallel. In this case, each of the charging path and the discharging path may include a diode.

The first ISG current control unit 220 forms the first dark current path I2 when the vehicle 10 is in a sleep mode. As described above, the first ISG current control unit 220 may include a variable resistor. A resistance value of the variable resistor may be controlled by the BMS 230.

The mode control unit 420 may connect the charging and discharging path I1 to the first terminal P1 or the first dark current path I2 to the second terminal P2 according to the operating mode of the vehicle 10. A control signal CON used to control the mode control unit 420 may be provided by the BMS 230.

In a case where the vehicle 10 is in the driving mode, the mode control unit 420 has a first status in which the switch may be connected to a terminal S1. Thus, a current output from the battery cell 210 is electrically connected to the first terminal P1 through the charging and discharging unit 410. If the power generation module 110 supplies a charging current through the first terminal P1 in the driving mode, the charging current is supplied to the battery cell 210 through the charging and discharging unit 410.

In a case where the vehicle 10 is in the sleep mode, the mode control unit 420 has a second status in which the switch may be connected to a terminal S2. Thus, the current output from the battery cell 210 is supplied to electrical loads through the first ISG current control unit 220 and the first terminal P1. As described above, the resistance value of the variable resistor of the first ISG current control unit 220 varies with respect to voltage levels of the battery cell 210 in the sleep mode. Also, the resistance value of the variable resistor of the first ISG current control unit 220 may be controlled by the BMS 230 in the sleep mode.

Figure 5:
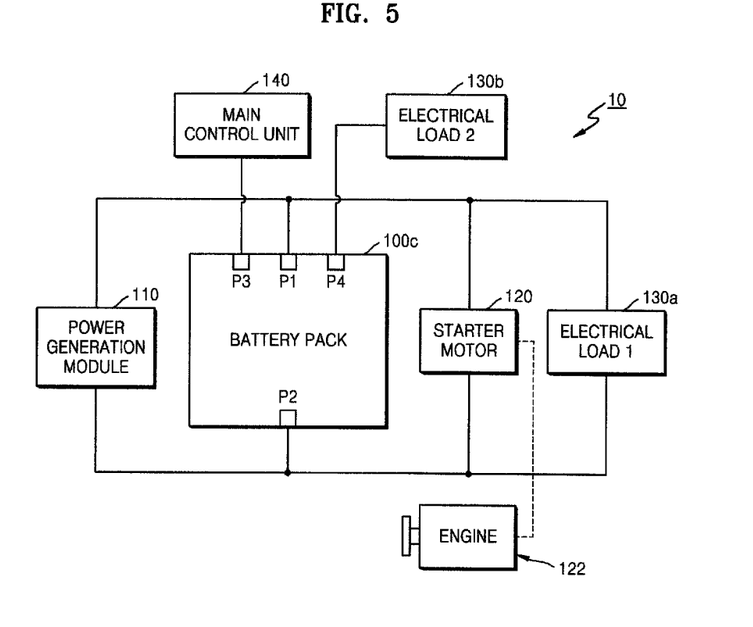
FIG. 5 is a diagram of a structure of a vehicle according to another embodiment of the present invention.

FIG. 5 is a diagram of a structure of the vehicle 10 according to another embodiment of the present invention.

The vehicle 10 according to another embodiment of the present invention may include electrical loads that are not allowed to be turned off even in a sleep mode. A battery pack 100c may provide a fourth terminal P4 to which a current is supplied all the time even in the sleep mode. According to such a structure, a designer of the vehicle 10 connects electrical loads that are not allowed to be turned off even in the sleep mode to the fourth terminal P4 so that corresponding electrical loads may not be turned off even in the sleep mode.

For example, as shown in FIG. 5, the electrical load 1 130a may be connected to the first terminal P1 to stop operating according to an output voltage level of the first terminal P1 in the sleep mode, whereas the electrical load 2 130b is connected to the fourth terminal P4 to operate even in the sleep mode.

Figure 6:
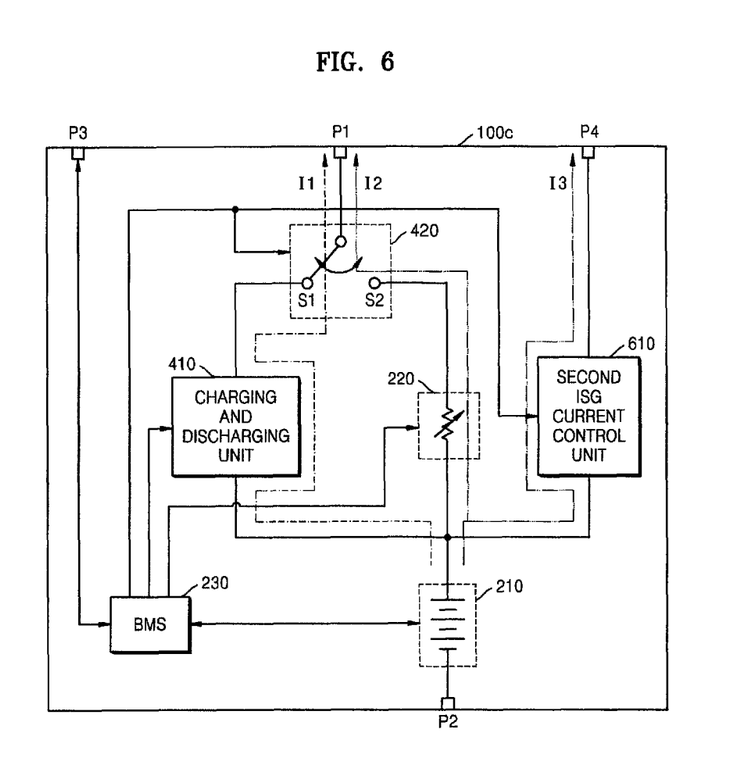
FIG. 6 is a diagram of a structure of a battery pack according to another embodiment of the present invention.

FIG. 6 is a diagram of a structure of the battery pack 100c according to another embodiment of the present invention.

The battery pack 100c according to another embodiment of the present invention may include the battery cell 210, the first ISG current control unit 220, the BMS 230, the charging and discharging unit 410, the mode control unit 420, and a second ISG current control unit 610.

According to an embodiment of the present invention, the second ISG current control unit 610 may be connected between the battery cell 210 and the fourth terminal P4 to form a second dark current path I3.

According to an embodiment, the second ISG current control unit 610 may be implemented to include a conductor. In this case, power is supplied to an electrical load connected to the fourth terminal P4 through the second dark current path I3 in a driving mode and sleep mode all the time, and thus power is more reliably supplied to the electrical load, and the electrical mode may be turned on even in the sleep mode.

According to another embodiment, the second ISG current control unit 610 may be implemented to include a switch. According to the present embodiment, the switch of the second ISG current control unit 610 may be turned on in the driving mode and sleep mode, and may be turned off if it is detected that the battery pack 100c is in a dangerous status or condition. For example, in a case where the battery pack 100c is overheated, overcharged, over-discharged, and is likely to explode in the sleep mode, the second ISG current control unit 610 may be turned off. Also, in a case where remaining power of the battery cell 210 approaches or reaches a restriction level by which the starter motor 120 may operate once in the sleep mode, the second ISG current control unit 610 may change the switch thereof to an off status to wholly block a dark current. A control signal used to control the second ISG current control unit 610 may be provided by the BMS 230. Also, if it is detected that the battery pack 100c is in the dangerous status or condition, the first dark current path I2 may also be blocked.

Figure 7:
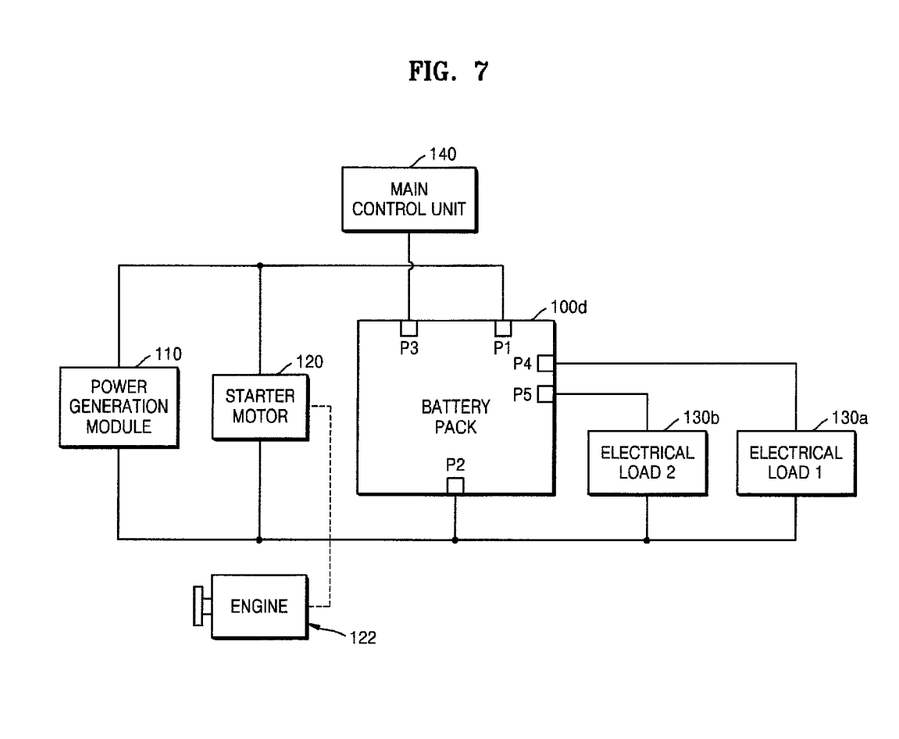
FIG. 7 is a diagram of a structure of a vehicle according to another embodiment of the present invention.

FIG. 7 is a diagram of a structure of the vehicle 10 according to another embodiment of the present invention.

Referring to FIG. 7, the vehicle 10 according to another embodiment of the present invention may include at least one electrical load, i.e. the electrical load 1 130a and the electrical load 2 130b, connected to a battery pack 100d through respective terminals of the battery pack 100d. That is, the battery pack 100d may provide the electrical load 1 130a with the fourth terminal P4 for supplying power and the electrical load 2 130b with the fifth terminal P5 for supplying power. Thus, the power generation module 110 and the starter motor 120 may be connected to the first terminal P1 and charging and discharging current flow in the first terminal P1, and the electrical load 1 130a and the electrical load 2 130b are respectively connected to the fourth terminal P4 and the fifth terminal P5 and a current for driving the electrical load 1 130a and the electrical load 2 130b and a dark current flow in the fourth terminal P4 and the fifth terminal P5.

According to the above-described structure of the vehicle 10, a plurality of electrical loads may be individually controlled to be turned on/off. Also, instead of turning the electrical loads off step by step according to rating voltage levels, the electrical loads may be turned off step by step according to an importance or an intensity of a dark current.

A method of blocking a dark current that flows in a plurality of electrical loads will now be described in detail.

Figure 8:
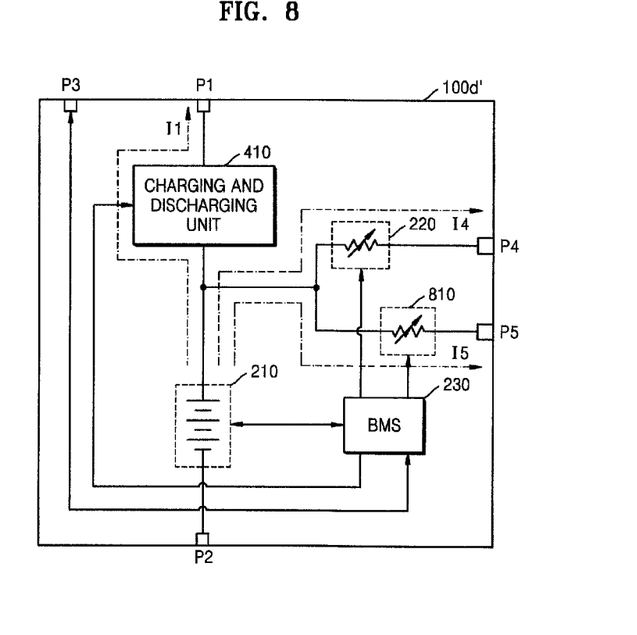
FIG. 8 is a diagram of a structure of a battery pack according to another embodiment of the present invention.

FIG. 8 is a diagram of a structure of a battery pack 100d' according to another embodiment of the present invention.

Referring to FIG. 8, the battery pack 100d' according to another embodiment of the present invention includes the battery cell 210, the first ISG current control unit 220, the BMS 230, a charging and discharging unit 410, and a third ISG current control unit 810.

According to an embodiment of the present invention, the first ISG current control unit 220 may be connected between the battery cell 210 and the fourth terminal P4 to form a fourth dark current path I4. Likewise, the third ISG current control unit 810 may be connected between the battery cell 210 and the fifth terminal P5 to form a fifth dark current path I5.

The BMS 230 controls variable resistance values of the first ISG current control unit 220 and the third ISG current control unit 810 to be reduced in a driving mode, and thus power consumption of a variable resistor may be minimized.

Meanwhile, the BMS 230 may control the variable resistance values according to a voltage of the battery cell 210 in a sleep mode. The BMS 230 controls the variable resistance values to be greater in the sleep mode than in the driving mode. Further, the BMS 230 may increase the variable resistance values as the voltage of the battery cell 210 is reduced, and thus, a dark current may be reduced if charging power of the battery cell 210 is reduced.

In particular, the BMS 230 of the battery pack 100d' according to the present embodiment may separately control the variable resistance values of the first ISG current control unit 220 and the third ISG current control unit 810. Accordingly, power may be supplied to one of the electrical load 1 130a and the electrical load 2 130b, and may not be supplied to the other one. That is, power may be supplied to only a desired electrical load according to a user's request. For example, it may be determined whether to supply power or not according to an importance of a load, and an amount of power consumption.

In a case where remaining power of the battery cell 210 approaches or reaches a restriction level by which the starter motor 120 may operate once from the voltage of the battery cell 210, the BMS 230 may minimize or wholly block the dark current by setting the maximum variable resistance values of the first ISG current control unit 220 and the third ISG current control unit 810.

Figure 9:
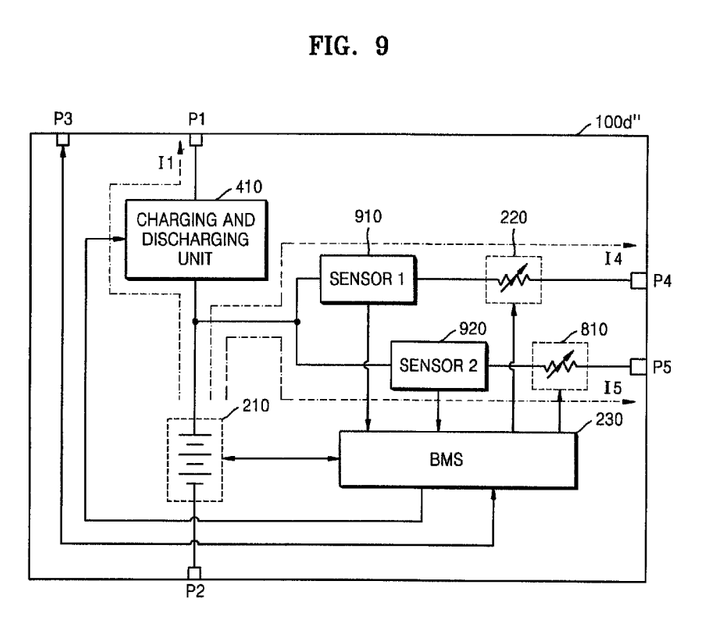
FIG. 9 is a diagram of a structure of a battery pack according to another embodiment of the present invention.

FIG. 9 is a diagram of a structure of a battery pack 100d'' according to another embodiment of the present invention. Differences between the battery pack 100d'' according to the present embodiment and the battery pack 100d' of FIG. 8 will be described below.

Referring to FIG. 9, the battery pack 100d'' according to the present embodiment includes the battery cell 210, the first ISG current control unit 220, the BMS 230, the charging and discharging unit 410, the third ISG current control unit 810, a sensor 1 910, and a sensor 2 920.

According to an embodiment of the present invention, the sensor 1 910 and the first ISG current control unit 220 are connected in series to each other between the battery cell 210 and the fourth terminal P4 to form the fourth dark current path I4. An arrangement sequence of the sensor 1 910 and the first ISG current control unit 220 may change. Likewise, the sensor 2 920 and the third ISG current control unit 810 are connected to each other between the battery cell 210 and the fifth terminal P5 to form the fifth dark current path I5.

The sensor 1 910 and the sensor 2 920 respectively sense intensities of two current that flow in the fourth dark current path I4 and the fifth dark current path I5. The sensor 1 910 and the sensor 2 920 transmit sensing results to the BMS 230.

According to an embodiment of the present invention, the BMS 230 may separately control variable resistance values of the first ISG current control unit 220 and the third ISG current control unit 810 based on the sensing results of current received from the sensor 1 910 and the sensor 2 920. The BMS 230 may block a dark current path in a case where a dark current value is greater than a reference value. For example, in a case where an intensity of a dark current sensed by the sensor 1 910 is greater than the reference value, the BMS 230 may minimize or block power supply to the electrical load 1 130a by setting the maximum variable resistance value of the first ISG current control unit 220.

According to another embodiment of the present invention, the BMS 230 may control the variable resistance values of the first ISG current control unit 220 and the third ISG current control unit 810 step by step based on the sensing results of current received from the sensor 1 910 and the sensor 2 920 and a voltage of the battery cell 210. In this regard, the BMS 230 may include a plurality of reference values used to control resistance values by a plurality of steps. Each of the reference values may be determined according to the voltage of the battery cell 210. For example, if the voltage of the battery cell 210 has a first voltage value, and the intensity of the dark current is greater than a first reference value, the BMS 230 controls the intensity of the dark current to be smaller than the first reference value by increasing the variable resistance values of the first ISG current control unit 220 and the third ISG current control unit 810. If the voltage of the battery cell 210 is reduced to have a second voltage value, and the intensity of the dark current is greater than a second reference value, the BMS 230 controls the intensity of the dark current to be smaller than the second reference value by further increasing the variable resistance values of the first ISG current control unit 220 and the third ISG current control unit 810. In this regard, the second reference value is smaller than the first reference value.

Also, in the present embodiment, in a case where remaining power of the battery cell 210 approaches or reaches a restriction level by which the starter motor 120 may operate once from the voltage of the battery cell 210, if the intensity of the dark current is greater than a minimum reference value, the BMS 230 may minimize or wholly block the dark current by setting the maximum variable resistance values of the first ISG current control unit 220 and the third ISG current control unit 810.

Figure 10:
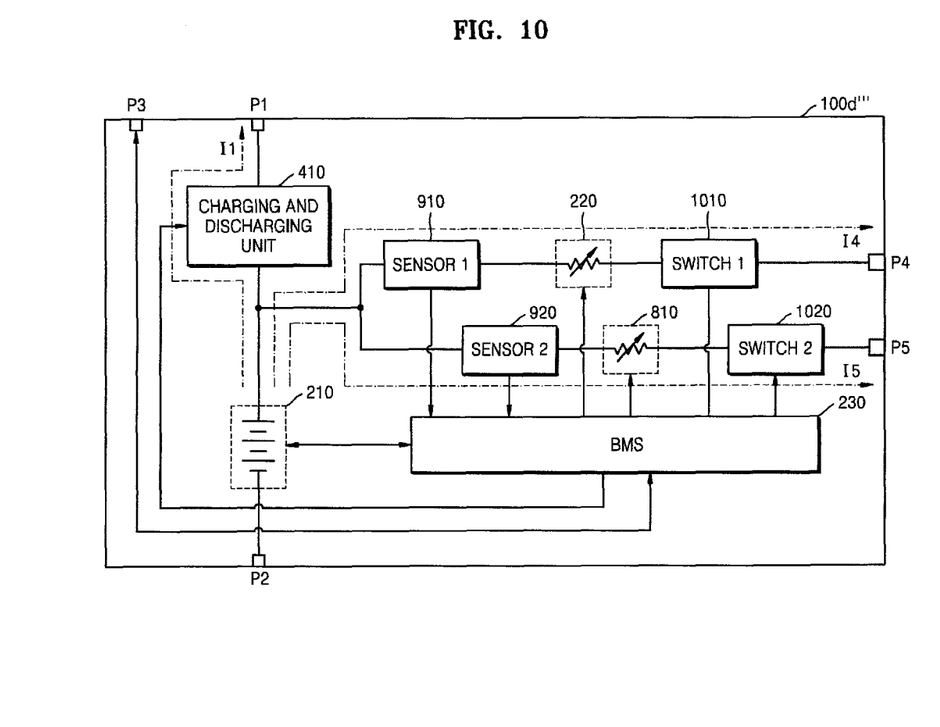
FIG. 10 is a diagram of a structure of a battery pack according to another embodiment of the present invention.

FIG. 10 is a diagram of a structure of a battery pack 100d''' according to another embodiment of the present invention. Differences between the battery pack 100d''' according to the present embodiment and the battery pack 100d'' of FIG. 9 will be described below.

Referring to FIG. 10, the battery pack 100d''' according to the present embodiment includes the battery cell 210, the first ISG current control unit 220, the BMS 230, the charging and discharging unit 410, the third ISG current control unit 810, the sensor 1 910, the sensor 2 920, a switch 1 1010, and a switch 2 1020.

According to an embodiment of the present invention, the sensor 1 910, the first ISG current control unit 220, and the switch 1 1010 may be connected in series to each other between the battery cell 210 and the fourth terminal P4 to form the fourth dark current path I4. An arrangement sequence of the sensor 1 910, the first ISG current control unit 220, and the switch 1 1010 may change. Likewise, the sensor 2 920, the third ISG current control unit 810, and the switch 2 1020 may be connected to each other between the battery cell 210 and the fifth terminal P5 to form the fifth dark current path I5.

According to the present embodiment, the switch 1 1010 and the switch 2 1020 may be used to wholly block the fourth dark current path I4 and the fifth dark current path I5, respectively. Even if the first ISG current control unit 220 and the third ISG current control unit 810 have the maximum variable resistance values, a dark current weakly flows, which causes unnecessary power consumption of the battery cell 210. Thus, to wholly block the fourth dark current path I4 and the fifth dark current path I5, the BMS 230 opens the switch 1 1010 and/or the switch 2 1020 to wholly block a dark current.

Although not shown, the battery packs 100d'~100d''' of FIGS. 8 through 10 may further include a mode control unit in a node to which the first ISG current control unit 220, the charging and discharging unit 410, and the third ISG current control unit 810 may be connected. The battery cell 210 may be connected to the charging and discharging unit 410 in a driving mode and to the first ISG current control unit 220 and the third ISG current control unit 810 in a sleep mode.

Alternatively, the battery cell 210 may be connected to the first ISG current control unit 220, the charging and discharging unit 410, and the third ISG current control unit 810 in the driving mode and to the first ISG current control unit 220 and the third ISG current control unit 810 in the sleep mode.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A battery pack for starting an engine having an idle stop & go (ISG) system in which the engine is repeatedly stopped and restarted to conserve fuel, said battery pack, comprising:
a rechargeable battery;
a first ISG current control unit having a variable resistor electrically connected to the rechargeable battery; and
a battery management system (BMS) electrically connected to the rechargeable battery and the first ISG current control unit, said BMS sets a resistance value of the variable resistor according to a current mode of the ISG system,
wherein the BMS sets the resistance value of the variable resistor as a first resistance value to form a charging and discharging path when the current mode is in a driving mode of the ISG system, and sets the resistance value of the variable resistor as a second resistance value to form an ISG current path when the current mode is in a sleep mode of the ISG system.

2. The battery pack recited in claim 1, wherein the driving mode of the ISG system of the engine is at an idling speed or greater of the engine and the sleep mode of the ISG system of the engine is when the engine is turned off.

3. The battery pack recited in claim 2, wherein the first resistance value is less than the second resistance value.

4. The battery pack recited in claim 1, wherein the BMS detects a voltage of the rechargeable battery when the ISG system is in a sleep mode and adjusts the resistance value of the variable resistor according to the voltage of the rechargeable battery, said sleep mode of said ISG system is when the engine is turned off.

5. The battery pack recited in claim 4, when the voltage of the rechargeable battery is detected by the BMS as lower than a predetermined value, the resistance value of the variable resistor is increased by the BMS.

6. A battery pack for starting an engine having an idle stop & go (ISG) system in which the engine is repeatedly stopped and restarted to conserve fuel, said battery pack, comprising:
a rechargeable battery;
a first ISG current control unit having a variable resistor electrically connected to the rechargeable battery;
a battery management system (BMS) electrically connected to the rechargeable battery and the first ISG current control unit, said BMS sets a resistance value of the variable resistor according to a current mode of the ISG system;
a charging and discharging unit electrically connected to the rechargeable battery; and
a mode control unit selectively electrically connected to the charging and discharging unit and the first ISG current control unit,
wherein the charging and discharging unit forms a charging and discharging path when the ISG system is in a driving mode and the first ISG current control unit forms a first ISG current path when the ISG system is in a sleep mode, and
wherein the driving mode of the ISG system of the engine is at an idling speed or greater of the engine and the sleep mode of the ISG system of the engine is when the engine is turned off.

7. The battery pack recited in claim 6, wherein the charging and discharging unit is a conductor, resistor or a switch.

8. The battery pack recited in claim 6, wherein when the ISG system is in the driving mode, the mode control unit is switched to connect to a first switching terminal (S1) so that a current output from the rechargeable battery is electrically connected to a first terminal (P1) through the charging and discharging unit and a charging current is supplied through the first terminal to the rechargeable battery through the charging and discharging unit from a power generation module.

9. The battery pack recited in claim 8, wherein when the ISG system is in the sleep mode, the mode control unit is switched to connect a second switching terminal (S2) so that a current output from the rechargeable battery is supplied to electrical loads through the first ISG current control unit and the first terminal.

10. The battery pack recited in claim 6, further comprising:
a second ISG current control unit electrically connected to the rechargeable battery to supply electrical power from the rechargeable battery to an electrical load through a second ISG current path at all times in both the driving mode and the sleep mode.

11. The battery pack recited in claim 10, wherein the electrical loads are a plurality of electrical loads with a portion of said plurality of electrical loads never allowed to be turned off in the sleep mode.

12. The battery pack recited in claim 11, wherein the second ISG current control unit is a switch that is turned on in both the driving mode and sleep mode and turned off when a potentially dangerous condition is detected in the battery pack.

13. A battery pack for starting an engine having an idle stop & go (ISG) system in which the engine is repeatedly stopped and restarted to conserve fuel, said battery pack, comprising:
a rechargeable battery;
a charging and discharging unit electrically connected between the rechargeable battery and a first terminal to form a charging and discharging path;
a first ISG current control unit having a first variable resistor electrically connected between the rechargeable battery and a second terminal to form a first dark current path;
a second ISG current control unit having a second variable resistor electrically connected between the rechargeable battery and a third terminal to form a second dark current path; and
a battery management system (BMS) electrically connected to the rechargeable battery and the first and second ISG current control units, said BMS sets a resistance value of each of the first and second variable resistors according to a current mode of the ISG system,
wherein the BMS controls variable resistance values in the first and second ISG current control units to be greater in a sleep mode than in a driving mode.

14. The battery pack recited in claim 13, wherein the BMS separately controls the variable resistance values of the first ISG current control unit and the second ISG current control unit to vary the voltage supplied from the second and third terminals.

15. The battery pack recited in claim 14, further comprising:
a first sensor electrically connected in series between the rechargeable battery and the first ISG current control unit to sense the current flow in the first dark current path; and
a second sensor electrically connected in series between the rechargeable battery and the second ISG current control unit to sense the current flow in the second dark current path,
wherein sensing results of the current flows sensed by the first and second sensors are transmitted to the BMS.

16. The battery pack recited in claim 15, wherein the BMS separately controls the variable resistance values of the first ISG current control unit and the second ISG current control unit based on the sensing results of the current flow received from the first sensor and the second sensor.

17. The battery pack recited in claim 16, further comprising:
a first switch electrically connected in series between the first ISG current control unit and the second terminal to form the first dark current path; and
a second switch electrically connected in series between the second ISG current control unit and the third terminal to form the second dark current path.

18. The battery pack recited in claim 17, wherein the first and second switches are connected to and under the control of the BMS and either or both the first and second switch are opened to block current leakage.

* * * * *